US008471905B2

(12) United States Patent
Kennedy et al.

(10) Patent No.: US 8,471,905 B2
(45) Date of Patent: Jun. 25, 2013

(54) METHODS AND APPARATUS FOR IMAGING (75) Inventors: Diana J Kennedy, Tucson, AZ (US); Toby E. Reed, Columbia, MD (US); David L. Johansen, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 1002 days.

(21) Appl. No.: 12/421,153

(22) Filed: Apr. 9, 2009

(65) Prior Publication Data

US 2010/0259607 A1 Oct. 14, 2010

(51) Int. Cl.
*H04N 7/18* (2006.01)
*G06K 9/32* (2006.01)

(52) U.S. Cl.
USPC .......................................... 348/144; 382/299

(58) Field of Classification Search
USPC .......................................... 348/144; 382/299
See application file for complete search history.

(56) References Cited

U.S. PATENT DOCUMENTS

| 5,535,291 A | 7/1996 | Spencer et al. | |
|---|---|---|---|
| 5,712,685 A | 1/1998 | Dumas | |
| 6,072,889 A * | 6/2000 | Deaett et al. | 382/103 |
| 6,229,928 B1 | 5/2001 | Matsuzawa | |
| 6,344,893 B1 | 2/2002 | Mendlovic et al. | |
| 7,617,060 B1 * | 11/2009 | Rauch et al. | 702/85 |
| 7,860,344 B1 * | 12/2010 | Fitzpatrick et al. | 382/291 |
| 2002/0171651 A1 * | 11/2002 | Kurihara et al. | 345/540 |
| 2008/0030587 A1 * | 2/2008 | Helbing | 348/208.4 |
| 2008/0175509 A1 * | 7/2008 | Wheeler et al. | 382/260 |
| 2009/0257683 A1 * | 10/2009 | Cloud et al. | 382/299 |

OTHER PUBLICATIONS

James Roger Roeder, "Assessment of super-resolution for face recognition from very-low resolution images" (Jan. 1, 2009). ETD Collection for University of Texas, El Paso, p. 1-12.*
Peng Huang; Jiajun Bu; Chun Chen; Kangmiao Liu; Guang Qiu, "Improve Image Annotation by Combining Multiple Models," Signal-Image Technologies and Internet-Based System, 2007. SITIS '07. Third International IEEE Conference on , vol., No., pp. 3,9, Dec. 16-19, 2007.*
Tang MengXing; Dong Xiuzhen; You Fusheng; Shi Xuetao; Qing MingXin; Fu Feng, "Improving EIT image quality by using multiple meshes combination," Engineering in Medicine and Biology Society, 1998. Proceedings of the 20th Annual International Conference of the IEEE , vol. 2, No., pp. 1055,1057 vol. 2, Oct. 29-Nov. 1, 1998.*
Shimizu, H.; Poggio, T., "Direction estimation of pedestrian from multiple still images," Intelligent Vehicles Symposium, 2004 IEEE , vol., No., pp. 596,600, Jun. 14-17, 2004.*

* cited by examiner

*Primary Examiner* — Lynn Feild
*Assistant Examiner* — Taylor Elfervig
(74) *Attorney, Agent, or Firm* — Lando & Anastasi, LLP (57) ABSTRACT

Methods and apparatus for imaging according to various aspects of the present invention may generate an enhanced image of a target in an environment using image data from a sensor. The methods and apparatus may scale the image data to a higher resolution and register the image represented by the image data with other images of the same target. The enhanced image of the target is generated according to the registered images.

8 Claims, 7 Drawing Sheets

INPUT FRAMES    SUPER-SAMPLED IMAGE

METHODS AND APPARATUS FOR IMAGING

GOVERNMENT CONTRACT RELATIONSHIP

This invention was made with Government support under Contract Number N0024-03-C-6111, SM3 Standard Missile Systems with the United States Navy. The Government of the United States may have certain rights in this invention.

CROSS-REFERENCES TO RELATED APPLICATIONS

This application claims the benefit of U.S. Provisional Patent Application No. 61/043,697, filed Apr. 9, 2008.

BACKGROUND

Many systems rely on imaging to operate. For example, various missile guidance systems operate in conjunction with an imaging system to generate images of a target and its environment. The missile guidance system uses the images to guide the missile to the target and, in some cases, to a point on the target to achieve desired effects. Other systems use imaging to generate images for other purposes, such as communication, target acquisition, research, and the like.

Environmental effects and aspects of the imaging equipment may degrade the acquired images. For example, imperfections in the optical systems and associated sensors may distort the image. In addition, environmental factors like heat and atmospheric effects can degrade the image. For example, missiles may be subject to aero-thermal heating effects that exaggerate optical distortions on infrared images. Distortions may be manifested in the form of waves of astigmatism, trefoil, coma, and defocus in the optical assembly. As a result, the image of the target is distorted, which may adversely affect missile guidance.

SUMMARY OF THE EMBODIMENTS

Methods and apparatus for imaging according to various aspects of the present invention may generate an enhanced image of a target in an environment using image data from a sensor. The methods and apparatus may filter and/or scale the image data to a higher resolution and register the image represented by the image data with other images of the same target. The enhanced image of the target is generated according to the registered images.

BRIEF DESCRIPTION OF THE DRAWING FIGURES

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Methods and apparatus for processing image data according to various aspects of the present invention operate in conjunction with at least one sensor, a computer, and an output system. The sensor generates data corresponding to a sensed object, such as a target. The computer receives and processes the sensor data to generate information useful to the output system, such as image data representing an image of the target. The output system receives and uses the image data from the computer, such as to guide a missile to the target, classify the target, render the image to a user, store the image data, and/or convey the image data to other systems.

Figure 14:
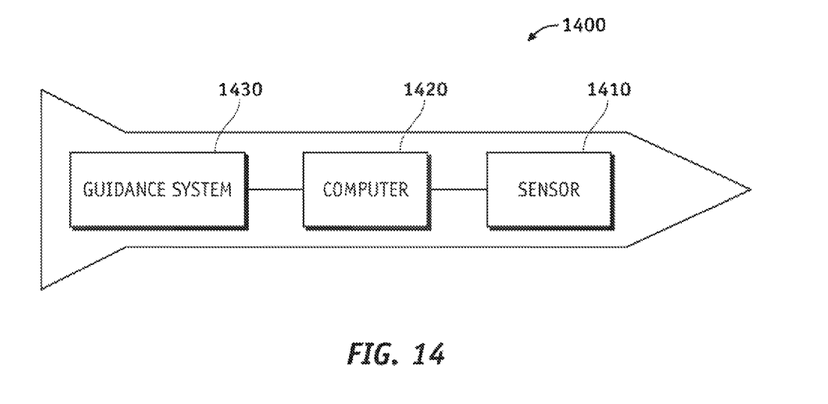
FIG. 14 is a representation of a missile.

Referring to FIG. 14, in one exemplary embodiment, the methods and apparatus for processing image data are implemented in conjunction with a missile guidance system for a missile 1400. For example, the sensor 1410 may generate sensor data corresponding to the target, the computer 1420 may generate image data according to the sensor data, and the output system 1430 may comprise the missile guidance system to adjust the course of the missile 1400 according to the image data to impact the target. In one embodiment, the target may comprise any appropriate object, such as another missile having asymmetry along at least one of its axes. For example, the target may include a distinguishable nose and tail, and the resulting output image data tends to preserve such shapes and features such as for nose-tail discrimination, aimpoint selection, and target acquisition, discrimination, and/or recognition. The target may comprise, however, any appropriate object, such as a symmetrical object or the like.

The sensor 1410 generates data corresponding to an environment. The sensor 1410 may comprise any appropriate system adapted to generate data corresponding to the target and/or the environment around the sensor 1410. For example, the sensor 1410 may comprise an imaging sensor, such as a charge-coupled device (CCD), an infrared sensor, a camera, or other sensor adapted to generate signals corresponding to received electromagnetic energy. In the present embodiment for a missile 1400 seeker system, the sensor 1410 may comprise a conventional optical sensor sensitive to a particular spectrum, such as infrared sensor, a visible light sensor, a laser sensor, or a radar sensor. For example, the sensor 1410 may include a conventional focal plane array (FPA) that generates successive frames of sensor data corresponding to an image of the target and/or the surrounding environment.

The output system 1430 uses the image data from the computer 1420. The output system 1430 may comprise any suitable system for utilizing the image data, such as a storage system, a display, a command and control system, or a transmission system. In the present embodiment, the output system 1430 comprises a guidance system for the missile 1400 that adjusts the course of the missile 1400, at least in part according to the image data.

The computer 1420 processes the sensor data to generate image data for the output system 1430. The computer 1420 may comprise any appropriate system for processing the image data, such as a processor and a memory. The memory stores data, such as sensor data, image data, and other data used by the processor. The processor processes the data, including the sensor data, to generate the image data provided to the output system 1430. In the present embodiment, the computer 1420 comprises a dedicated processor that generates a high resolution image of the target for the output system 1430. The processor may comprise a conventional processor programmed to perform the functions.

In one embodiment, methods and apparatus for processing image data according to various aspects of the present invention may be applied to processing video data from an imaging system in which there is an object of interest at high contrast to the background, and where the object has asymmetry along at least one of its axes, such as a missile to be intercepted against a sky or space background. Alternatively, the methods and apparatus may be adapted for other applications, such as target recognition for land- and sea-based targeting. The exemplary system produces video of the object at an increased resolution. The system may also maintain the shape and proportionality of the object in the output video, for example when the target and sensor 1410 are stationary with respect to each other or are approaching each other. The system may be implemented entirely in software, hardware, or a combination.

For example, the computer 1420 may perform an image upscale process to the sensor data to generate a higher resolution image of the target. The image upscale process may include any appropriate processes and techniques to generate image data using multiple frames of sensor data. For example, the process of observing a target with an optical sensor may involve relative motion between the target and the sensor 1410. The motion may be exploited to generate a higher resolution image of the object, for example if the appearance of the target does not change significantly over short periods of time. An image upscale process according to various aspects of the present invention combines relatively low resolution images of an object to generate a higher resolution image. The multiple lower resolution images may be captured over a selected interval, such as a brief period of time. In the present embodiment, the image upscale process comprises a spatial-temporal super-resolution process that provides enhanced performance with a conventional lower resolution sensor, while mitigating optical distortions.

Figure 1:
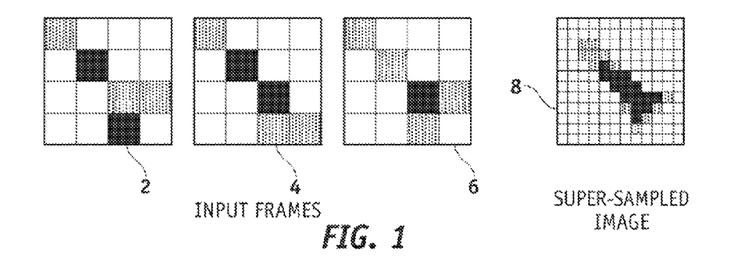
FIG. 1 is an illustration of multiple images combined in a super-sampled image.

An exemplary image upscaling process may register and combine images of an object, collected over time, to synthesize a higher-resolution super-sampled image. For example, referring to FIG. 1, multiple consecutive input frames 2, 4, 6 may be received from the sensor 1410 and processed by the computer 1420 using the image upscale process to output the super-sampled image 8 of the object, which may contain many more pixels. As the object moves around in the FPA of the optical sensor, its movement does not typically correspond to an integer pixel distance. Instead, if the object is positioned at the exact center of a pixel in the current frame, it is often centered a fractional pixel distance away on subsequent frames. Over time, this sub-pixel motion encodes additional information about the object. The image upscaling process uses this information to produce a higher resolution image. The output of the present image upscale process may comprise an image where many small pixels represent each true pixel on the FPA or a portion of the FPA. The image upscale process may also be performed on a per frame basis in real time.

In one embodiment, the computer 1420 acquires consecutive frames of sensor data from the sensor 1410. The sensor data may be processed, such as by selecting a portion of the data for analysis, scaling, rotating, and registering the corresponding images to facilitate combining the frames, and/or reducing optical distortions and aberrations. The multiple frames of sensor data may be combined to create a higher resolution image.

The object may change in appearance over time, for example due to becoming closer in range. Combining excessively dissimilar images may reduce the quality of the super-sampled output image. To mitigate this effect, one embodiment of the computer 1420 may use a limited number of frames to form the super-sampled image. For example, a selected number of frames of data may be stored in a buffer, and the output image data may be generated based on the information in the buffer. In one embodiment, each received frame is stored in a first-in-first-out (FIFO) buffer so that the output image data is generated according to a limited amount of the most recent data received from the sensor 1410. When the FIFO is full, the oldest frame is pushed out of the FIFO and removed from the super-sampled image. This process may continue for every frame as it is received. The FIFO may comprise a circular buffer to minimize memory reads and writes.

The sensor 1410 may provide each frame of sensor data to the computer 1420 for processing. Each frame may be stored in the FIFO buffer, and the high-resolution image may be derived from the sensor data stored in the FIFO buffer. The computer 1420 may also perform any suitable additional functions to enhance the image processing. In one embodiment, the computer 1420 may perform deconvolution of the sensor data for the target, for example to remove blurring effects and/or optical aberrations. Additionally, if an approximation of a point spread function of the optical system is known, the computer 1420 may utilize the point spread function to reduce or eliminate the image degradation caused by optical distortion. The computer 1420 may also perform one or more interpolation functions, such as to maintain smooth edges in the image of the target, reduce output artifacts in the resulting image data, and/or compensate for rotation of the target relative to the sensor 1410. For example, the computer 1420 may use simple features of the image to align successive video frames. In addition, the computer 1420 may correct for the rotation of tile target in the sensor plane, and may scale the image in conjunction with parabolic interpolation to maintain smooth edges and reduce artifacts in the output video. Further, the computer 1420 may generate the output image data in real time.

Figure 3:
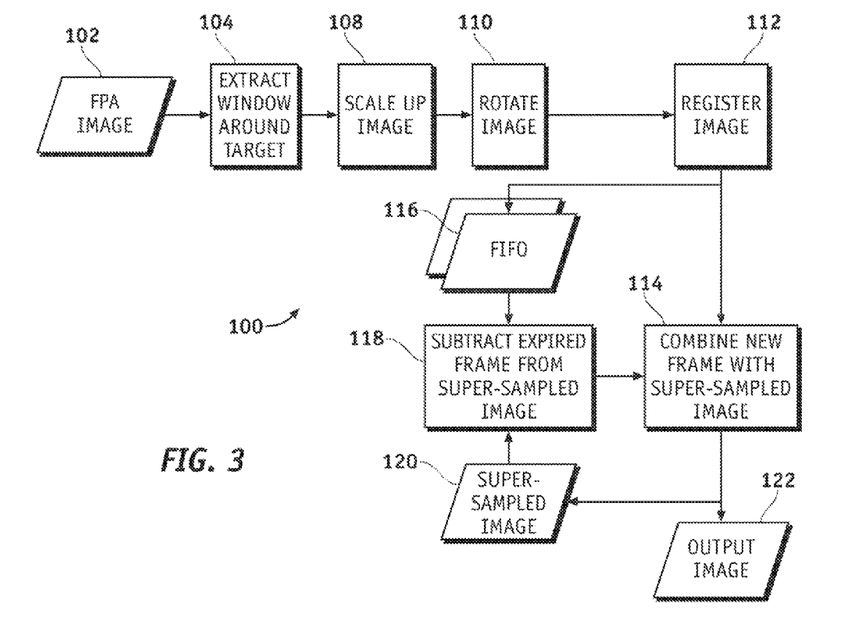
FIG. 3 is a functional block diagram of an image enhancement process.
Figure 11:
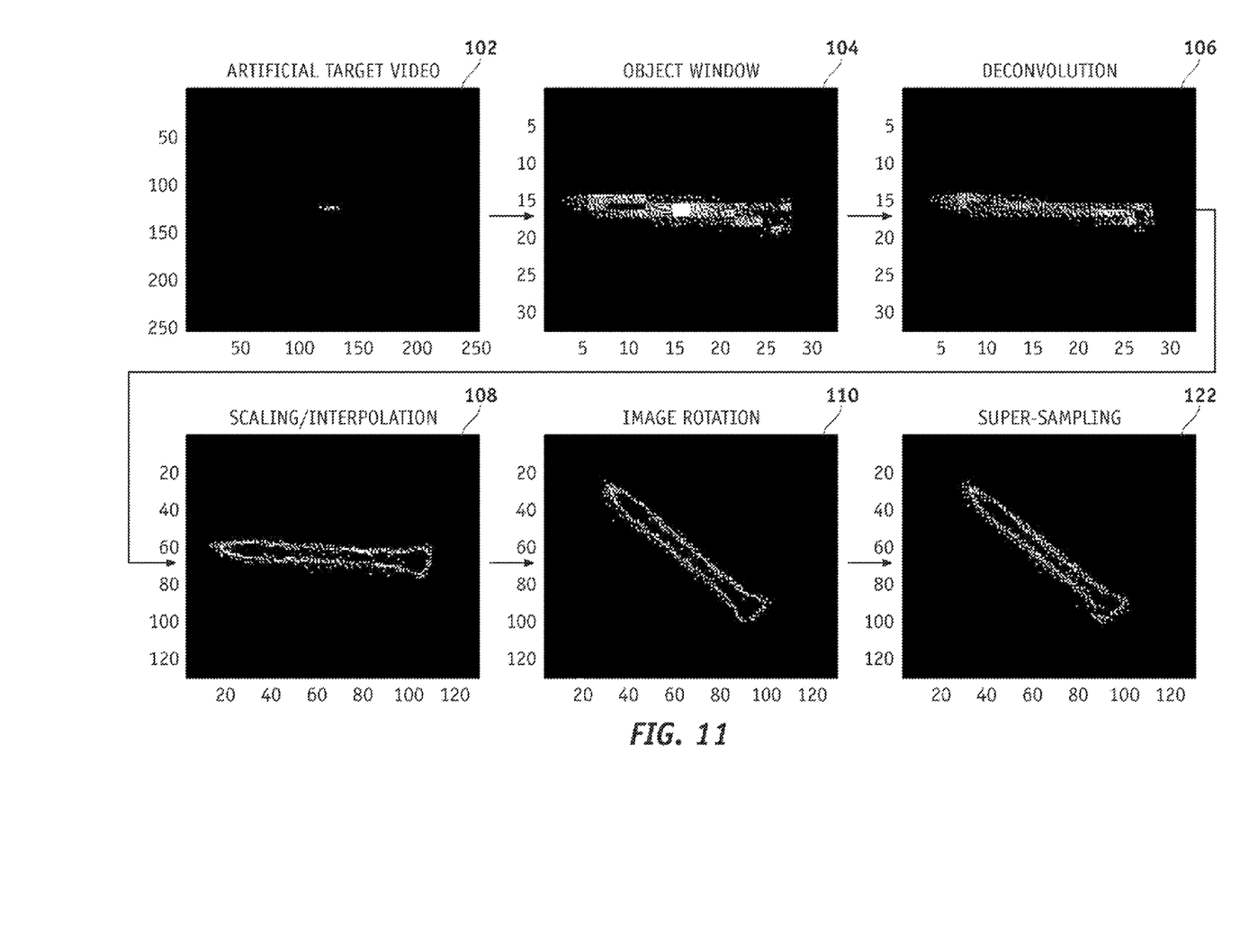
FIG. 11 is a graphical representation of an image being processed.

The computer 1420 may perform any appropriate functions to facilitate processing the sensor data. Referring to FIGS. 3 and 11, in one embodiment of a super resolution image element and image upscaling process 100 according to various aspects of the present invention, the computer 1420 receives the sensor data representing an image including the target (102). The computer 1420 may initially process each frame of the sensor data to identify the target in the image. For example, the computer 1420 may compare each pixel of the sensor data to a pixel threshold that separates the target from the background. The computer 1420 may also identify a centroid of the target and the angle of the target image. The computer 1420 may apply any appropriate technique for identifying the target, its centroid, and/or other characteristics of the target. Using these characteristics and a registration process (112), the computer 1420 may combine multiple deconvolved images to form a super-sampled (122) high resolution image.

In one embodiment, the computer 1420 analyzes a subset of the sensor data to generate the output image data. For example, referring again to FIGS. 3 and 11 and to FIG. 2, the computer 1420 may select an area of the image represented by the sensor data for further analysis, such as for computational efficiency (104). The image upscale calculations may be performed over an object window that is smaller than the FPA, such as an area defined around the area centroid of the target. In the present embodiment, the object window is defined as a pre-selected number of pixels in size (SUB_ROWS, SUB_COLS) with the area centroid of the target at the center of the object window. The object window may comprise, however, any suitable portion of the sensor data, such as a dynamically-sized window around the target's area centroid.

Figure 2:
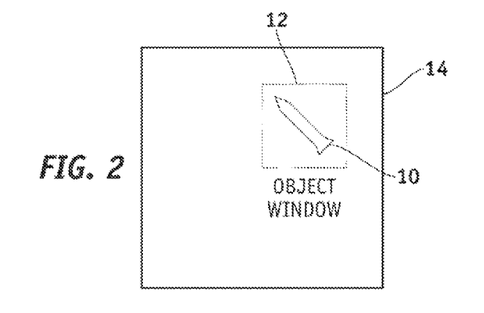
FIG. 2 is an illustration of an object in an object window.

In the present embodiment, the object window is extracted from the FPA image by iterating over the y and z coordinates of the object window, calculating the FPA coordinates that correspond to the current y and z location in the object window, and assigning pixel values from the FPA to the object window. For example, to extract the object window, the computer 1420 may copy to the memory a rectangular region of pixel values between:

$$(\text{centroid}\_z - \text{SUB\_ROWS}/2) \leq z < (\text{centroid}\_z + \text{SUB\_ROWS}/2) \quad (1)$$

$$(\text{centroid}\_y - \text{SUB\_COLS}/2) \leq y < (\text{centroid}\_y + \text{SUB\_COLS}/2) \quad (2)$$

where centroid_z is the z coordinate of the target's area centroid and centroid_y is the y coordinate of the target's area centroid.

If any of the array indices in the object window fall outside of a valid range, such as beyond the edges of the FPA, then the pixel value of the object window at that location may be assigned a default value, such as zero. The valid range may be, for example:

$$0 \leq z < \text{FPA\_ROWS} \quad (3)$$

$$0 \leq y < \text{FPA\_COLS} \quad (4)$$

where FPA_ROWS is the number of rows in the FPA and FPA_COLS is the number of columns in the FPA.

The computer 1420 may also calculate an offset of the center of the object window from the center of the FPA, such as for coordinate translation. In the present embodiment, the center of the object window is located at (SUB_ROWS/2, SUB_COLS/2). The object window's center is positioned at the target's area centroid on the FPA.

For example, after the object window has been extracted, the pixel offset (super_shift_z, super_shift_y) from the center of the object window to the center of the FPA may be calculated. Super_shift_z is the z offset of the extracted window from the FPA center in pixels, and super_shift_y is the y offset of the extracted window from the FPA center in pixels. The object window may use sub-coordinates, which are the same as the FPA coordinates but translated by super_shift_y, super_shift_z, and may have a maximum value, such as (SUB_ROWS−1) and (SUB_COLS−1).

Figure 4:
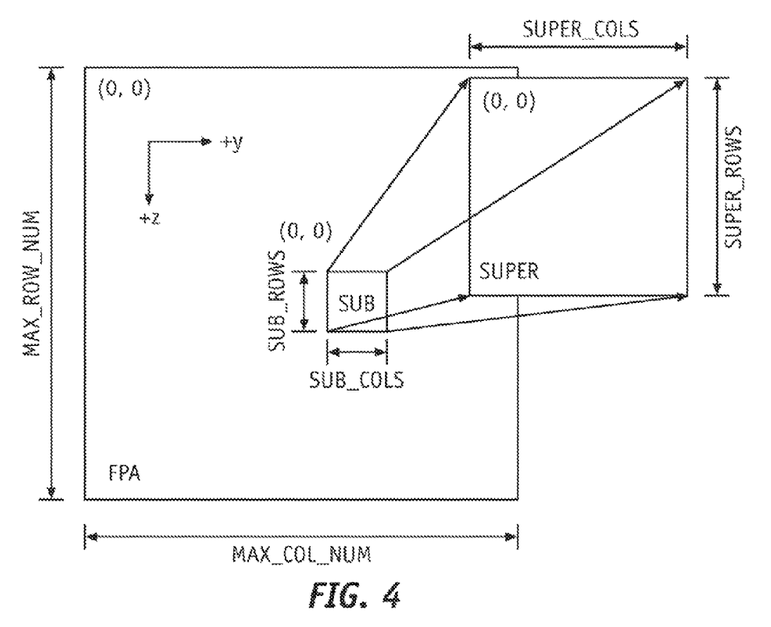
FIG. 4 is an illustration of a focal plane array (FPA), a sub-coordinate system, and a super-coordinate system.

The enhanced output image data may comprise an array of values in which multiple pixels represent each true pixel. Consequently, the higher resolution output image data may comprise an array larger than the object window and be organized according to a set of super-coordinates. Conversion between the FPA and the super-coordinates may require scaling, translation, and sometimes rotation. The center of the super-coordinate plane may be defined to be the center of the FPA plane, unless an additional translation has taken place. In such case, super_shift_y and super_shift_z may be nonzero.

The computer 1420 may receive a point spread function (PSF) in any appropriate manner, such as by generating the PSF and/or retrieving the PSF from the memory. For example, the PSF may be initially generated and stored in memory for use by the computer 1420. Any necessary data processing/transformation to generate the PSF may be performed upon initialization and/or under other appropriate circumstances, such as when the PSF to be used for deconvolution has changed due to changes in the sensor optics system and/or the operating environment.

The PSF may comprise a two-dimensional array of samples at sub-pixel intervals describing the energy spread over a central pixel and several neighboring pixels. To obtain suitable results from the deconvolution algorithm, the PSF may be downsampled so that the resolution of the image and the PSF are the same. In the present embodiment, the resolution of the PSF is one sample per pixel.

Figure 6:
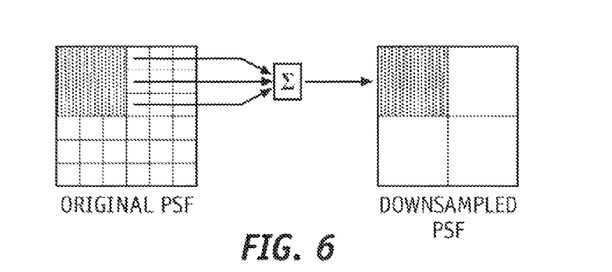
FIG. 6 is an illustration of PSF downsampling.

Referring to FIG. 6, the present exemplary downsampling process determines the value of each sample in the downsampled PSF by summing the samples of the original PSF that fall within each new pixel. After downsampling is completed, the PSF may be normalized such that the sum of all its samples is equal to 1.0. To prevent division by zero, this step may not occur unless the sum is non-zero. An exemplary downsampling process to generate a PSF having dimensions SRC_PSF_ROWS by SRC_PSF_COLS may be implemented according to the following pseudo-code:

```
Total = 0;
for (i = 0; i < PSF_ROWS; i++) {
    for (j = 0; j < PSF_COLS; j++) {
        psf_down(i, j) = 0;
        i_start = floor((i/PSF_ROWS) * SRC_PSF_ROWS);
        i_stop = floor (((i+1)/PSF_ROWS) *
            SRC_PSF_ROWS) − 1;
        j_start = floor((j/PSF_ROWS) * SRC_PSF_COLS);
        j_stop = floor(((j+1)/PSF_COLS) * SRC_PSF_COLS) −
            1;
        for (p = i_start; p <= i_stop; p++) {
            for (q = j_start; q <= j_stop; q++) {
                psf_down(i, j) = psf_down(i, j) +
                    source_psf(p, q);
            }
        }
        Total = total + psf_down(i, j);
    }
}
if (total > 0.001) {
    for (i = 0); i < PSF_ROWS; i++){
        for (j = 0; j < PSF_COLS; j++) {
            psf_down(i, j) = psf_down(i, j)/total;
        }
    }
}.
```

After performing any necessary computations, the computer 1420 may calculate the reflected PSF for performing deconvolution. For example, the reflected PSF may be generated according to a process described by the following pseudo-code:

```
for (i = 0; i < PSF_ROWS; i++) {
    for (j = 0; j < PSF_COLS; j++) {
        reflect_psf_down(i, j) = psf_down((PSF_ROWS - 1) - i,
        (PSF_COLS-1)-j;
    }
}.
```

Figure 5:
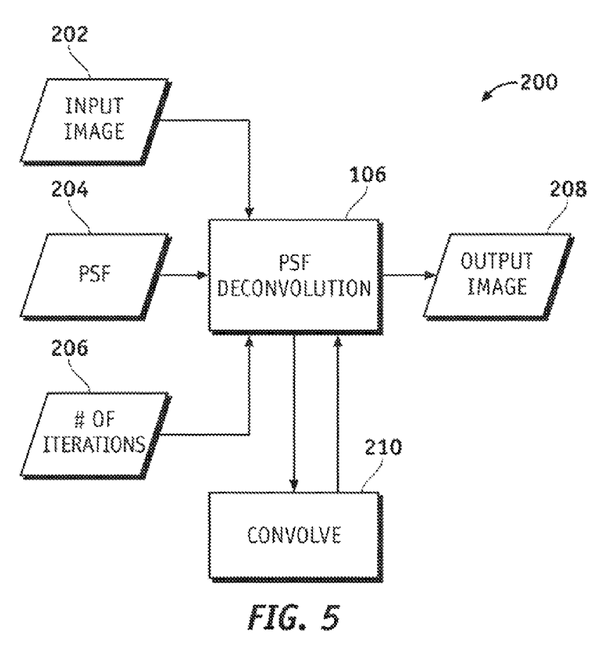
FIG. 5 is functional block diagram of a deconvolution process.

The PSF 204 may be formatted appropriately for use by the computer 1420. Deconvolution may be performed upon data from each frame prior to combining the data from the multiple frames. Referring to FIG. 5, the computer 1420 may perform the deconvolution process 106 for a selected number of iterations 206 to generate the deconvolved output image data 208 using the PSF 204 and the input image data 202. The number of iterations 206 may comprise an integer number of iterations of the algorithm to be carried out, and may be selected according to any suitable criteria. For example, too few iterations may not have enough effect, while too many iterations may result in significant distortion of the image. The output of the deconvolution algorithm may comprise the processed image having the same dimensions as the input image.

All or a portion of the sensor data may also be processed to initially improve the image data, for example to reduce blurring, remove artifacts, and the like. For example, the computer 1420 may process the sensor data in the object window to compensate for image-blurring effects caused by the optical system that generated the sensor data, such as one or more lenses, reflectors, and FPAs. In one embodiment, referring again to FIG. 11, the computer 1420 performs a deconvolution process on the sensor data using a point spread function (PSF) associated with the sensor 1410 (106). The computer 1420 may perform the deconvolution process in any appropriate manner to reduce the effects described by the PSF. The computer 1420 may limit application of the deconvolution process to the image data extracted from the object window.

The PSF may represent the effects of the sensor 1410 on the image data. As light from a distant point source passes through the optics, imperfections in the design and/or realization of the optical system cause the energy to spread out and fall on multiple pixels. The PSF may comprise a two-dimensional qualitative description of the spreading effect for a set of optics under certain conditions, and may comprise a refined or rough representation of the effects. The image detected on the FPA is a physical convolution of the ideal image and the PSF. If the PSF, or an approximation, is known at the time of image capture, the deconvolution algorithm may reverse some of the blurring in that image, producing a more useful image. Thus, by performing deconvolution according to the PSF, the effects of the sensor 1410 on the data may be reversed to arrive at a more accurate representation of the target.

Convolution 210 is a standard mathematical operation that may be used in the implementation of the deconvolution process. Convolution is commutative, therefore A*B=B*A. The two-dimensional discrete convolution of matrices A(M×M) and B(N×N) results in a matrix C(M+N−1×M+N−1) defined by:

$$C(z,y)=A*B=\Sigma_j\Sigma_k A(j,k)B(z-j,y-k) \quad (8)$$

where the summation takes place over all points at which both A and B are defined.

For the purpose of PSF deconvolution, only the M×M portion at the center of the convolution result is of interest. For example, referring to FIG. 7, in the case M=4. and N=3, (M+N−1)=6. The gray area at the center of the convolution result indicates the region of interest. Calculation of the exterior bands is unnecessary. Convolution in the deconvolution process may be performed between an M×M image and an N×N point spread function. The dimensions M and N of the convolution arguments may be constant.

Figure 7:
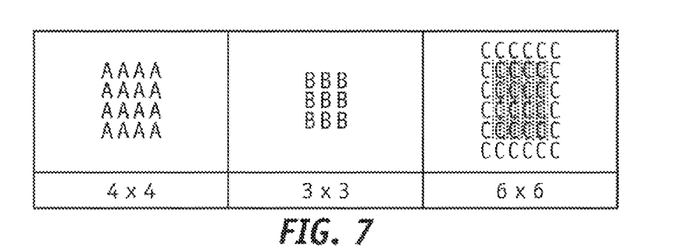
FIG. 7 is an example of a region of interest within a convolution result.

A pseudo-code description of a process to perform such a convolution C=A*B may comprise:

```
for (z = N/2; z < M +N/2; z++) {
    for (y = N/2; y < M + N/2; y++) {
        C(z - N/2, y- N/2) = 0;
        for (j = 0; j < N; j++) {
            for (k = 0; k < N; k++) {
                if {(z-j > -1 and z-j < M) and (y-k > -1 and
                y-k < M)}
                {
                    C(z - N/2, y - N/2) = C(z - N/2, y - N/2)
                    +
                        B(j, k) *A (z-j,
                    y-k);
                }
            }
        }
    }
}.
```

The deconvolution process may be implemented in any appropriate manner to process the sensor data and enhance the image. In the present exemplary embodiment, the deconvolution is implemented in conjunction with a Lucy-Richardson deconvolution algorithm, for example in real time. The Lucy-Richardson algorithm is an iterative deconvolution technique implemented as a sequence of matrix operations performed in image data. The output of the Lucy-Richardson algorithm for iteration k+1 is calculated using the expression:

$$R(k+1)=R(k)\cdot(P'\cdot(I/(P\cdot R(k)))) \quad (7)$$

Where:
R(k) is the SUB_ROWS by SUB_COLS deconvolution result for iteration k;
R(0) is defined to be I;
I is the SUB_ROWS by SUB_COLS output image;
P is a PSF_ROWS by PSF_COLS square matrix containing the PSF to be used for deconvolution;
P' is a precalculated horizontally and vertically flipped copy of P;
* denotes two-dimensional convolution as performed by the algorithm;
× is element by element matrix multiplication; and
/ is element by element matrix division.

Due to the potential for an overflow or divide-by-zero, the result of the first convolution may be checked for values less than 1.0 before it is used as a divisor. Any such values may be set equal to 1.0. The deconvolution process may be broken up into serialized calculations as follows:
Initialization:
    Set iteration counter k=0
    Set input I=image_in
    Set result R(0)=I
    Allocate SUB_ROWS by SUB_COLS buffers a and b
    Set P=psf_down
    Set P'=reflect_psf_down
Each iteration:
    Calculate a=P*R(k)
    Set equal to 1.0 any positions in matrix a having a value of less than 1.0
    Calculate b=I/a
    Calculate a=P'*b
    Calculate R(k+1)=R(k)×a
    Increment k
After final iteration:

$$\text{Set deconv\_out}=R(k).$$

The computer 1420 may not retain R(k) for all k; only the previous R(k) may be saved, and it may be overwritten in the final step.

Figure 8:
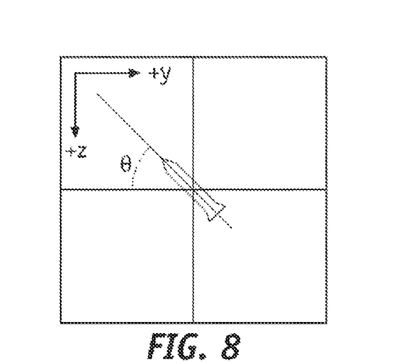
FIG. 8 is a graphical representation of an object angle.

The sensor data may also be processed to facilitate combining the data from multiple frames as part of a image registration process (108) or other data sets to generate the output image data for the output system 1430. For example, referring again to FIGS. 3 and 11, the data may be rotated (110), scaled (108), and/or registered (112) so that the various images are aligned. Referring to FIG. 8, the computer 1420 may determine an angle of orientation for the target. In the present embodiment, the target's orientation may be represented by an angle theta measured clockwise from the negative extent of the y-axis about the object centroid.

The object angle theta may be calculated from the deconvolved image in any suitable manner, such as using weighted moments. The theta angle may be calculated from the deconvolved image using the following calculation:

```
sum_of_y = 0;
sum_of_z = 0;
sum_of_yy = 0;
sum_of_zz = 0;
sum = 0;
for (i = 0, i < SUB_ROWS; i++) {
    for (j = 0, j < SUB_COLS; j++) {
        if (deconv_array(i, j) > threshold) {
            sum_of_y += (j+1)*deconv_array(i, j);
            sum_of_z += (i+1)*deconv_array(i, j);
            sum_of_yy += (j+1)*(j+1) *deconv_array(i, j);
            sum_of_yz += (j+1)*(i+1)*deconv_array(i, j);
            sum_of_zz += (i+1)*(i+1)*deconv_array(i, j);
            sum += deconv_array(i, j);
        }
    }
}
sumyy = sum_of_yy - (sum_of_y * sum_of_y/sum);
sumyz = sum_of_yz - (sum_of_y * sum_of_z/sum);
sumzz = sum_of_zz - (sum_of_z * sum_of_z/sum);
theta = atan2((2* sumyz), (sumyy - sumzz))/2;
```

The computer 1420 may perform any appropriate functions to facilitate processing the sensor data. Referring to FIGS. 3 and 11, in one embodiment of an image super resolution process 100 according to various aspects of the present invention, the computer 1420 receives the sensor data representing an image including the target (102). The computer 1420 may initially process each frame of the sensor data to identify the target in the image. For example, the computer 1420 may compare each pixel of the sensor data to a pixel threshold that separates the target from the background. The computer 1420 may also identify a centroid of the target. The computer 1420 may apply any appropriate technique for identifying the target, its centroid, and/or other characteristics of the target.

Various pixels, such as the target and target centroid, may be represented in any appropriate manner. In the present embodiment, pixels are identified using conventional Cartesian coordinates, for example using a y-coordinate representing the centroid pixel column and a z-coordinate representing the centroid pixel row. Referring to FIG. 4, the origin of the coordinate system may be the upper left corner of the FPA. Any appropriate coordinate system, however, may be utilized to refer to the sensor data.

In addition, the computer 1420 may check the sensor data to ensure that the inputs are reasonable or otherwise suitable for processing. The computer 1420 may terminate and/or adjust the image upscale process in the event that the sensor data is unsuitable for further analysis. For example, the computer 1420 may terminate the image upscale process unless the object area centroid y-coordinate and z-coordinate are nonzero.

The image for each frame of data may also be scaled, such as to increase available resolution. The image may be scaled up or down in one or more dimensions by a selected amount. In the present embodiment, the computer 1420 scales the deconvolved image in each dimension by a factor of four to increase available resolution. The scaling may be performed using an interpolation method that fits each point and its surrounding four points to a parabolic plane. The computer 1420 may sample the values on that plane at the location of each new point. The fit of the data to the parabolic plane results in a more accurate estimation of the pixel values in the scaled image by providing a gradual transition between the center of the target and the edges, rather than the sharp transitions between pixel values that occur when no interpolation is performed.

Figure 9:
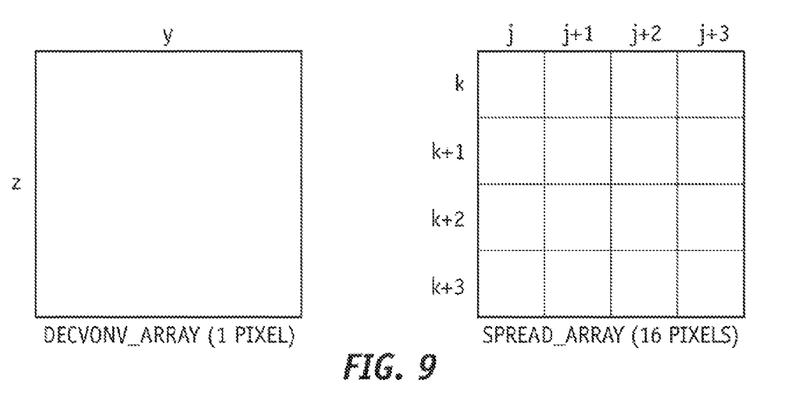
FIG. 9 is an illustration of pixel scaling.

For example, referring to FIG. 9, for each pixel in the deconvolved image, the pixels above, below, to the left of, and to the right of the pixel are located. The pixels are designated vU, vD, vL, and vR respectively, while the original pixel is designated v0. In the event any of the surrounding pixels are unavailable because the current pixel is located along one or more array edges, the value of the current pixel, v0, may be used instead. Iteration may take place over all pixel locations (y,z) in the deconvolved image to generate an upscaled and spread out image. For each pixel location, the location of the upper-left pixel (k,j) in the corresponding 4×4 pixel block in the spread out image may be calculated as:

$$k = 4*z \quad (9)$$

$$j = 4*y \quad (10)$$

For each coordinate pair, conditions may be required to assign pixel values in the spread out image. For example, the conditions may be that $k \geq 0$, $k < \text{SUPER\_ROWS}-4$, $j \geq 0$, and $j < \text{SUPER\_COLS}-4$. SUPER_ROWS is the number of rows in the spread out image and SUPER_COLS is the number of columns in the spread out image. In the present embodiment, sixteen interpolated pixel values are calculated from these points, for example according to the following parabolic interpolation equations:

$$\text{spread\_array}[k][j] = (92*v0 + 33*vL - 15*vR + 33*vU - 15*vD)/128$$

$$\text{spread\_array}[k+1][j] = (108*v0 + 33*vL - 15*vR + 9*vU - 7*vD)/128$$

$$\text{spread\_array}[k+2][j] = (108*v0 + 33*vL - 15*vR - 7*vU + 9*vD)/128$$

$$\text{spread\_array}[k+3][j] = (92*v0 + 33*vL - 15*vR - 15*vR + 33*vD)/128$$

$$\text{spread\_array}[k][j+1] = (108*v + 9*vL - 7*vR + 33*vU - 15*vD)/128$$

$$\text{spread\_array}[k+1][j+1] = (124*v0 + 9*vL - 7*vR + 9*vU - 7*vD)/128$$

$$\text{spread\_array}[k+2][j+1] = (124*v0 + 9*vL - 7*vR - 7*vU + 9*vD)/128$$

$$\text{spread\_array}[k+3][j+1] = (108*v0 + 9*vL - 7*vR - 15*vU + 33*vD)/128$$

spread_array[k][j+2]=(108*v0−7*vL+9*vR+33*vU−15*vD)/128 spread_array[k+1][j+2]=(124*v0−7*vL+9*vR+9*vU−7*vD)/128 spread_array[k+2][j+2]=(124*v0−7*vL+9*vR−7*vU+9*vD)/128 spread_array[k+3][j+2]=(108*v0−7*vL+9*vR−15*vU+33*vD)/128 spread_array[k][j+3]=(92*v0−15*vL+33*vR+33*vU−15*vD)/128 spread_array[k+1][j+3]=(108*v0−15*vL+33*vR+9*vU−7*vD)/128 spread_array[k+2][j+3]=(108*v0−15*vL+33*vR−7*vU+9*vD)/128 spread_array[k+3][j+3]=(92*v0−15*vL+33*vR−15*vU+33*vD)/128

In some circumstances, it is possible for the interpolated pixels to be negative. Therefore, the array used to store the interpolation result should be able to accept negative values. After each value in the spread out image (spread_array) has been calculated, any pixels having negative values or values less than a predetermined threshold value are set equal to zero. Any pixels having values greater than a maximum pixel value are set to the maximum pixel value.

Each of the frames processed must be registered to the previous frame in order for the FIFO to function properly. This is done by first rotating the image so the orientation angle (theta) of the target is aligned with that of the previous frame. The image is then translated so the weighted centroid is aligned with that of the previous frame. The computer 1420 may or may not account for rolling as part of the registration process.

The image may also be rotated, such as to orient the images of the target at the same angle. Because the orientation angle of the object may change from frame to frame, incoming frames may be rotated to the same angle before being combined to generate the output image data, for example in conjunction with the object angle theta. For example, bi-linear interpolation may be applied to reduce and/or control the effects of artifacts, such as artifacts introduced by filtering, imaged artifacts, or FPA defects, and maintain smooth edges on the rotated targets. Any appropriate process may be applied, however, to control the introduction and/or effects of artifacts in the image, such as tri-linear interpolation and other rotation interpolation techniques.

Figure 10:
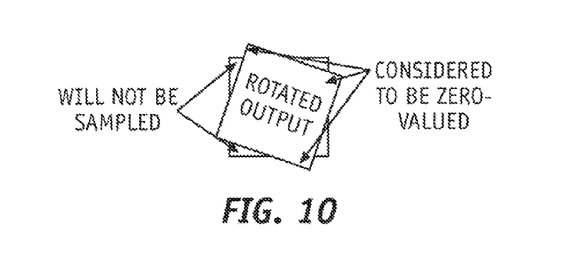
FIG. 10 is an illustration if image rotation.

Each point in the output image may be rotated by the desired angle of rotation, separating the integer and fractional parts of each rotated pixel location. The interpolated pixel value is calculated from the corresponding pixel value and its neighboring values in the input image. Referring to FIG. 10, if the rotated coordinates do not fall within a range of valid coordinates in the input image, the image sampling may not be performed and a pixel value of zero may be used instead. Likewise, any pixel values in the input image that fall outside the area of the output image after rotation may not be sampled and may consequently be absent in the output image.

A rotation matrix may provide a standard system for changing the angle of a vector without changing its magnitude. Rotation is performed by multiplying the vector with the rotation matrix. A two-dimensional rotation matrix is defined as:

$$M = \begin{vmatrix} \cos\theta & -\sin\theta \\ \sin\theta & \cos\theta \end{vmatrix} \quad (11)$$

where positive $\theta$ corresponds to a counter-clockwise rotation.

In the present embodiment, the computer 1420 applies a rotation algorithm that uses a specified center of rotation. The y and z coordinates of the center of rotation may be subtracted from the coordinates under rotation to perform a shift, then added back to the result. To rotate the point (z,y) about the center (cz,cy) by an angle $\theta$, the following equations may be evaluated to calculate the new rotated point (nz,ny) for sampling:

$$nz = cz + \cos(\theta) \cdot (z-cz) - \sin(\theta) \cdot (y-cy) \quad (12)$$

$$ny = cy + \sin(\theta) \cdot (z-cz) + \cos(\theta) \cdot (y-cy) \quad (13)$$

The interpolation process may be implemented in conjunction with integer and fractional components calculated as follows:

$$nz\_i = \text{floor}(nz) \quad (14)$$

$$ny\_i = \text{floor}(ny) \quad (15)$$

$$dz = nz - nz\_i \quad (16)$$

$$dy = ny - ny\_i \quad (17)$$

The interpolated value at (z,y) in the rotated, spread out image may be determined according to the following equations:

$$\begin{aligned}
\text{rotated\_spread\_array}(z, y) = & \quad (18) \\
\text{spread\_array}(nz\_i+1, ny\_i+1) \cdot (dz) \cdot (dy) + & \\
\text{spread\_array}(nz\_i+1, ny\_i) \cdot (dz) \cdot (1-dy) + & \\
\text{spread\_array}(nz\_i, ny\_i+1) \cdot (1-dz) \cdot (dy) + & \\
\text{spread\_array}(nz\_i, ny\_i) \cdot (1-dz) \cdot (1-dy) &
\end{aligned}$$

Equation (18) may be evaluated only when both of the following expressions are true:

$$0 \leq nz\_i < (\text{SUPER\_ROWS}-1) \quad (19)$$

$$0 \leq ny\_i < (\text{SUPER\_COLS}-1) \quad (20)$$

In the event either expression is false, the computer 1420 may assign a value of zero instead. When implementing this algorithm, the values of $\sin(\theta)$ and $\cos(\theta)$ may only be calculated once and stored in memory. A default rotation angle may be set to a selected value, such as $(\pi/4-\theta)$. Image rotation may occur about the center point, (SUPER_ROWS/2, SUPER_COLS/2).

Referring again to FIG. 3, the various images in the frames may be registered to facilitate combination of the data to generate the output image data (112). In various embodiments, the computer 1420 may register images solely according to attributes of the target image from the two-dimensional data. Alternatively, the registration may be performed using other criteria and/or data, for example non-sensor based inputs, such as the measurements of an inertial measurement unit. In the present embodiment, successive frames may be translated by overlapping and aligning their respective weighted centroids and/or weighted moments. The weighted centroids may be weighted according to the individual pixel values. Using weighted centroids to calculate the registration angle tends to remove image distortions from rolling and image upscale leakage. The computer 1420 may shift the centroid to the middle of the image, thus computationally simplifying the combination of frames to form the super-sampled image.

Translation of the images may be performed in any appropriate manner. In the present embodiment, translation is based on a weighted area centroid calculation performed on all pixel values above a predetermined threshold value within the scaled and rotated object window. For example, a sum for centroid calculation (sum) may be initialized to zero. Also, z and y values of centroid calculation (cent_z and cent_y) may be initialized to zero. A threshold may also be simultaneously applied to the rotated image data. The following expressions are evaluated for all pixel locations z,y (numbered from 0) in the data array having a value greater than the selected threshold:

$$\text{cent\_}z = \text{cent\_}z + (z+1) \cdot \text{rotated\_spread\_array}(z,y) \quad (21)$$

$$\text{cent\_}y = \text{cent\_}y + (y+1) \cdot \text{rotated\_spread\_array}(z,y) \quad (22)$$

$$\text{sum} = \text{sum} + \text{rotated\_spread\_array}(z,y) \quad (23)$$

Any pixels not having a value of greater than the selected threshold are assigned a value of zero. Once this calculation is complete, the weighted centroid coordinates cent_z and cent_y are assigned values as follows:

$$\text{cent\_}z = (\text{cent\_}z/\text{sum}) - 1 \quad (24)$$

$$\text{cent\_}y = (\text{cent\_}y/\text{sum}) - 1 \quad (25)$$

The necessary shift may be calculated with the following expressions:

$$\text{shift\_}z = \text{round}(\text{SUPER\_ROWS}/2 - \text{cent\_}z) \quad (26)$$

$$\text{shift\_}y = \text{round}(\text{SUPER\_COLS}/2 - \text{cent\_}y) \quad (27)$$

where "round" refers to rounding a real number to the nearest whole number.

The translation may be performed using the shift information. For each pixel (z,y) in the rotated, spread-out image, the computer 1420 may determine the shifted coordinate in the registered image:

$$k = z + \text{shift\_}z \quad (28)$$

$$j = y + \text{shift\_}y \quad (29)$$

All values of a registered image array may be initialized to zero. For each shifted pixel location (k,j) that satisfies $0 \geq k > \text{SUPER\_ROWS}$ and $0 \geq j > \text{SUPER\_COLS}$, the value in the rotated, spread out image data is copied into the registered image array. An additional offset from the center of the FPA resulting from registration may be scaled back into FPA coordinates and accounted for in the y and z offset values for the super-sampled output image data from the standard super coordinate system.

Each frame (or other appropriate subset) of sensor data may be stored in the FIFO for combination with other sensor data to generate the output image data. For example, the deconvolved, scaled, rotated, and/or registered data in the object window for each frame of sensor data may be stored in the FIFO upon completion of the initial processing. Referring again to FIG. 3, the FIFO 116 of the present embodiment stores incoming frames that have been deconvolved, scaled, rotated, and registered for the purpose of retrieving them later, so that they may be combined (114) to form the super-sampled output image data (122).

To fill the FIFO, the FIFO may be initialized to contain all zeros. An index to the next entry in the buffer size has an initial value of zero, and is incremented with the following expression:

$$\text{next} = (\text{next} + 1) \text{ modulo FIFO\_SIZE} \quad (30)$$

where FIFO_SIZE is the frame capacity of the FIFO. The index may be incremented immediately after a frame is stored in the buffer so that it always points to the oldest frame in the buffer. In the present embodiment, a frame is stored in the buffer by copying all pixels from registered image into the FIFO, using the value of "next" as the index. Immediately after the frame is copied, a count representing the number of super-sampled output images produced so far (super_image_count) may be incremented. The number of frames stored in the FIFO is thus equal to the super_image_count value or the FIFO_SIZE value, whichever is smaller.

When frames of data reach the end of the FIFO, they may be considered "expired" and removed from the super-sampled output image data, for example through subtraction. Subtraction may occur only when the super_image_count value is greater than or equal to the FIFO_SIZE value. Otherwise, the subtraction process may be bypassed.

The oldest frame data may be subtracted in any suitable manner. For example, two expressions may be evaluated for all (z,y) over the super-sampled image:

$$\frac{\left(\text{super\_array}(z,y) - \text{super\_array}(z,y) \cdot \atop \text{count\_mask}(z,y) - \text{FIFO}(\text{next},z,y)\right)}{\text{count\_mask}(z,y) - 1} \quad (31)$$

$$\text{count\_mask}(z,y) = \text{count\_mask}(z,y) - 1 \quad (32)$$

where "count_mask" is a per-pixel mask of the number of averaged frames in the super-sampled image.

The expressions may be evaluated only when the following conditions are satisfied. 1) There must be at least two pixels averaged at this location, e.g. count_mask(z,y)>1. 2) The super-sampled image is non-zero at this location, e.g. super_array(z,y)>0. And 3) the expired frame is nonzero at this location and thus contributed to this pixel's value, e.g. FIFO (next, z,y)>0. A check may be performed to ensure that no negative values are written to the super-sampled image super_array(z,y). Any negative values may be set to zero instead.

In the event count_mask(z,y) is equal to one, and the other two conditions are met, the following expressions are evaluated instead:

$$\text{super\_array}(z,y) = 0 \quad (33)$$

$$\text{count\_mask}(z,y) = 0 \quad (34)$$

When averaging in the algorithm, the average value pix_avg of N values $\text{pix\_val}_1, \text{pix\_val}_2, \ldots \text{pix\_val}_j, \ldots \text{pix\_val}_N$ may be calculated with the equation:

$$\text{pix\_avg} = (\text{pix\_val}_1 + \text{pix\_val}_2 + \ldots + \text{pix\_val}_j + \ldots + \text{pix\_val}_N)/N \quad (35)$$

Provided that N is known, and greater than 1, the value pix_val_j may be removed from the average by evaluating:

$$\text{pix\_avg}' = ((\text{pix\_avg} \cdot N) - \text{pix\_val}_j)/N - 1) \quad (36)$$

The various frames of data in the FIFO may be combined to generate the super-sampled image data. Referring again to FIG. 3, in the present embodiment, after the object image data has been extracted, deconvolved, scaled, rotated, and registered, the data may be combined (114) with the most recently generated output image data to form a new set of output image data (120). The data may be combined in any appropriate manner, such as by averaging the pixel values of each frame at each pixel location. Each pixel is averaged individually. Pixels having a value of zero may be omitted from the average calculation, so the combined output data does not include data for any zero-valued pixels.

In the present embodiment, the computer 1420 averages the pixel values using a mask of the same size as the super-sampled image. When a new pixel value is included in the average at a particular coordinate, the integer value stored in the mask is incremented at that coordinate. The entire mask may be initialized to zero, and its contents may be maintained between incoming frames. The following expressions may be evaluated for all z,y over the super-sampled image where the new data most recently added to the FIFO is greater than zero:

$$\text{super\_array}(z, y) = \frac{\left(\begin{array}{c}\text{super\_array}(z, y) \cdot \text{count\_mask}(z, y) + \\ \text{reg\_array}(z, y)\end{array}\right)}{\text{count\_mask}(z, y) + 1} \quad (37)$$

$$\text{count\_mask}(z, y) = \text{count\_mask}(z, y) + 1 \quad (38)$$

where reg_array(z,y) is the newest data in the FIFO.

After the expressions are evaluated, the super-sampled image is contained in a variable array (super_array). To generate the output image data 122, the computer 1420 may select those pixels satisfying selected criteria. For example, the computer 1420 may copy all pixel values in the variable array having pixel values above a selected threshold into an output image array 122 (out_array).

When averaging in the algorithm, the average value pix_avg of N values $\text{pix\_val}_1$, $\text{ix\_val}_2$, ... $\text{pix\_val}_j$, ... $\text{pix\_val}_N$ may be calculated with the equation:

$$\text{pix\_avg} = (\text{pix\_val}_1 + \text{pix\_val}_2 + \ldots + \text{pix\_val}_j + \ldots + \text{pix\_val}_N)/N \quad (39)$$

Provided that N is known, and greater than 0, the value $\text{pix\_val}_j$ may be added to the average by evaluating:

$$\text{pix\_avg}' = ((\text{pix\_val} \cdot N) + \text{pix\_val}_j)/N+1) \quad (40)$$

Figure 12:
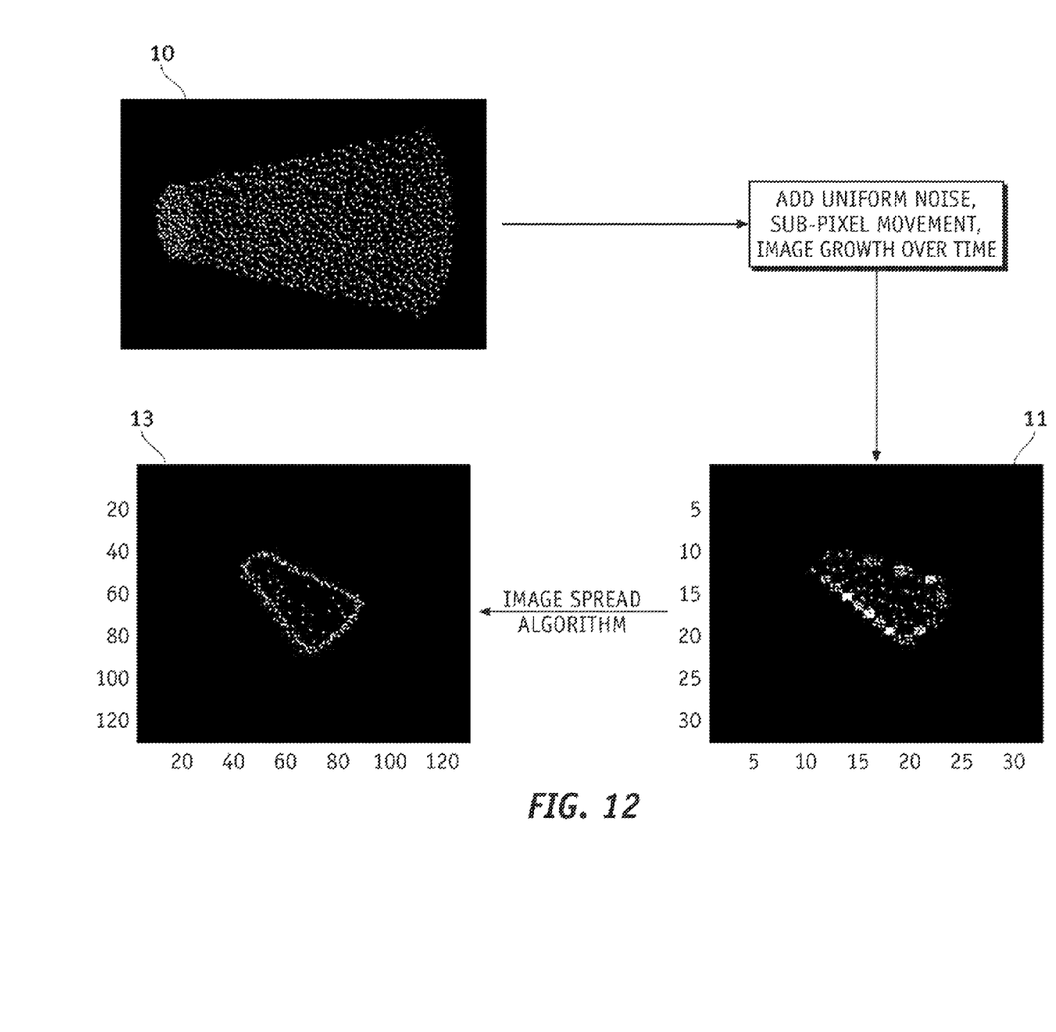
FIGS. 12 and 13 represent image generation and enhancement, such as for restoring the shape of the original object.
Figure 13:
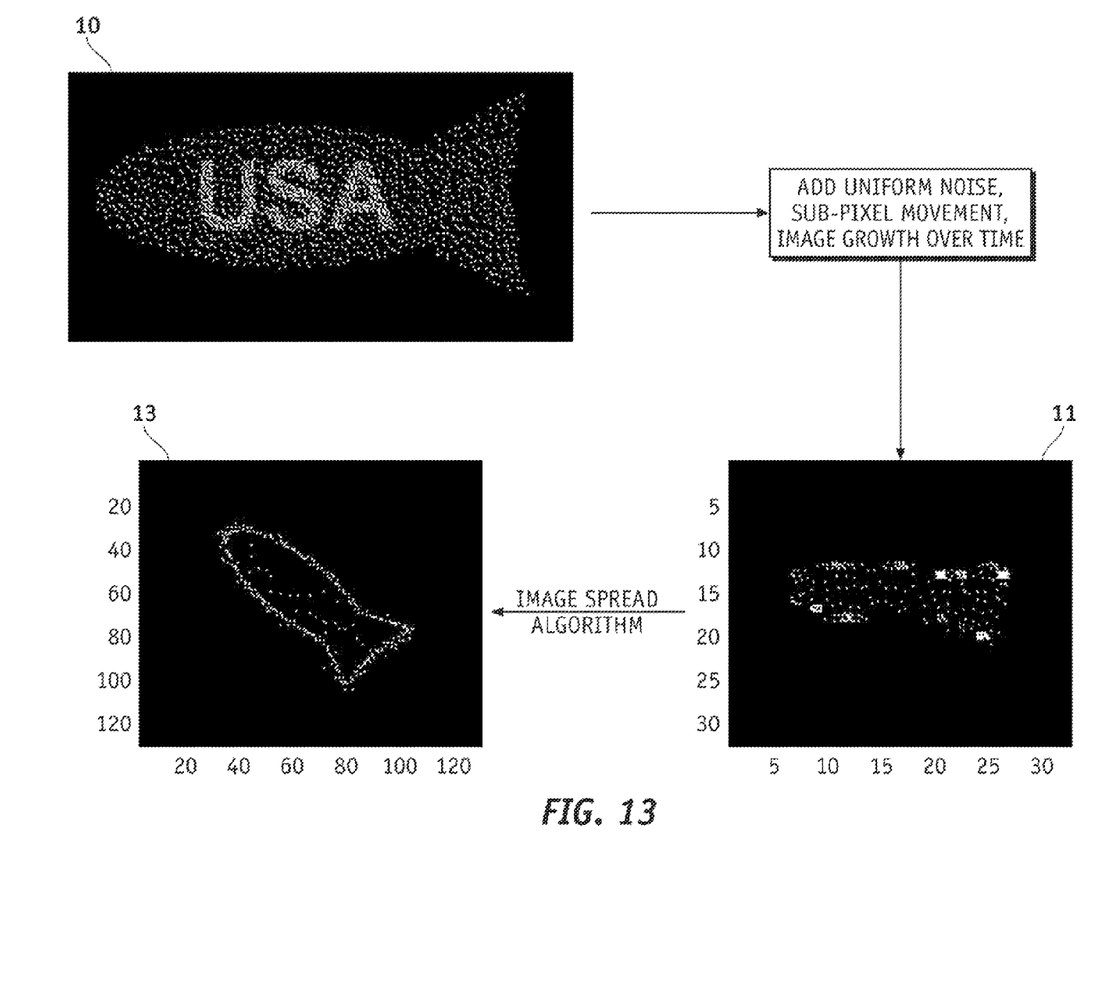

FIGS. 12 and 13 represent examples of image processing according to various aspects of the present invention. Referring to FIG. 12, an original image 10 represents a shape of the original object. The image 11 is significantly degraded due to noise, sub-pixel movement, and/or image growth over time. When the image data processed according to the present image upscale process, the original shape of the object is restored in a super-resolution image 13.

Similarly, referring to FIG. 13, an original target image 10 may have detail such as lettering. Convolving the image using the point spread function creates a view of the image 11 through the optics subject to noise, sub-pixel movement, and/or image growth over time. The resulting image 11 does not show the lettering and is irregular. By processing the image data according to the present image upscaling process, a crisper, more detailed image 13 may be generated.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention.

Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A missile guidance system assembly for generating an enhanced image of a target in an environment and guiding a missile based on the enhanced image, comprising:
  a sensor adapted to generate multiple consecutive frames of image data over time, wherein each frame of image data corresponds to an image of the target and the environment; and
  a computer responsive to the image data, wherein the computer is adapted to:
    select an object window within each frame of the generated image data including image data corresponding to the target;
    perform an upscale process to scale the image data within the object window to a higher resolution to produce a super-sampled output image, the upscale process including:
      rotating the image represented by the image data in each object window to present the image of the target at a selected angle;
      registering the image represented by the image data in the object window in a first frame with at least a second image represented by the image data in the object window in a second consecutive frame;
      deconvolving the image data according to a point spread function associated with the sensor; and
      combining at least the first and second consecutive frames of image data to generate the output image of the target according to the registered images by generating an average value for each pixel in the output image, the average value being determined from corresponding pixel values in each frame of the multiple consecutive frames of image data; and an output system coupled to the computer and adapted to receive the output image of the target from the computer and to provide a missile guidance signal responsive to the output image.

2. A missile guidance system assembly according to claim 1, wherein the computer is further adapted to scale the image data by spreading each pixel in the image data using a parabolic interpolation function.

3. A missile guidance system assembly according to claim 1, wherein the computer is adapted to rotate the image according to a bi-linear interpolation function.

4. A missile guidance system assembly according to claim 1 wherein the computer is further adapted to store the output image and the image data in at least the first and second frames in a first-in-first-out (FIFO) buffer.

5. A missile guidance system assembly according to claim 4, wherein the computer is further adapted to generate the output image of the target by combining the stored output image and at least the first and second frames stored in the FIFO buffer.

6. A missile guidance system assembly according to claim 1 wherein the computer is adapted to select the object window by:
 identifying a centroid of the target in the image; and
 defining the object window around the centroid.

7. A missile guidance system assembly according to claim 1, wherein the sensor comprises an FPA.

8. A missile guidance system assembly according to claim 1, wherein the computer is adapted to register the image according to a weighted centroid of the image of the target.

* * * * *